United States Patent [19]

Rubino et al.

[11] Patent Number: 5,230,005
[45] Date of Patent: Jul. 20, 1993

[54] ELECTRONIC TUNING OF A BROADBAND LASER

[75] Inventors: Robert A. Rubino, Tolland; Carl M. Ferrar, East Hartford; William H. Glenn, Vernon, all of Conn.

[73] Assignee: The United States of America as represented by the Secretary of the Navy, Washington, D.C.

[21] Appl. No.: 788,015

[22] Filed: Nov. 5, 1991

[51] Int. Cl.$^5$ ............................................... H01S 3/10
[52] U.S. Cl. ..................................... 372/20; 372/102; 372/106
[58] Field of Search ................... 372/20, 98, 102, 106

[56] References Cited

U.S. PATENT DOCUMENTS

| | | | |
|---|---|---|---|
| 4,229,710 | 10/1980 | Shoshan | 372/98 |
| 5,077,816 | 12/1991 | Glomb et al. | 372/20 |
| 5,081,630 | 1/1992 | Lowenthal et al. | 372/20 |
| 5,121,398 | 6/1992 | Rao | 372/20 |
| 5,136,596 | 8/1992 | Rao et al. | 372/20 |

OTHER PUBLICATIONS

D. J. Taylor, et al., Electronic Tuning of a Dye Laser Using Acousto-Optic Filter, Applied Physics Letters, vol. 19, No. 8 (Oct. 15, 1971) pp. 269–271.

Primary Examiner—John D. Lee
Assistant Examiner—Robert E. Wise
Attorney, Agent, or Firm—James T. Busch; Thomas E. McDonald; A. F. Kwitnieski

[57] ABSTRACT

A broadband laser which can be electronically tuned to a narrow line by insertion of a frequency selective element in the laser cavity.

10 Claims, 1 Drawing Sheet

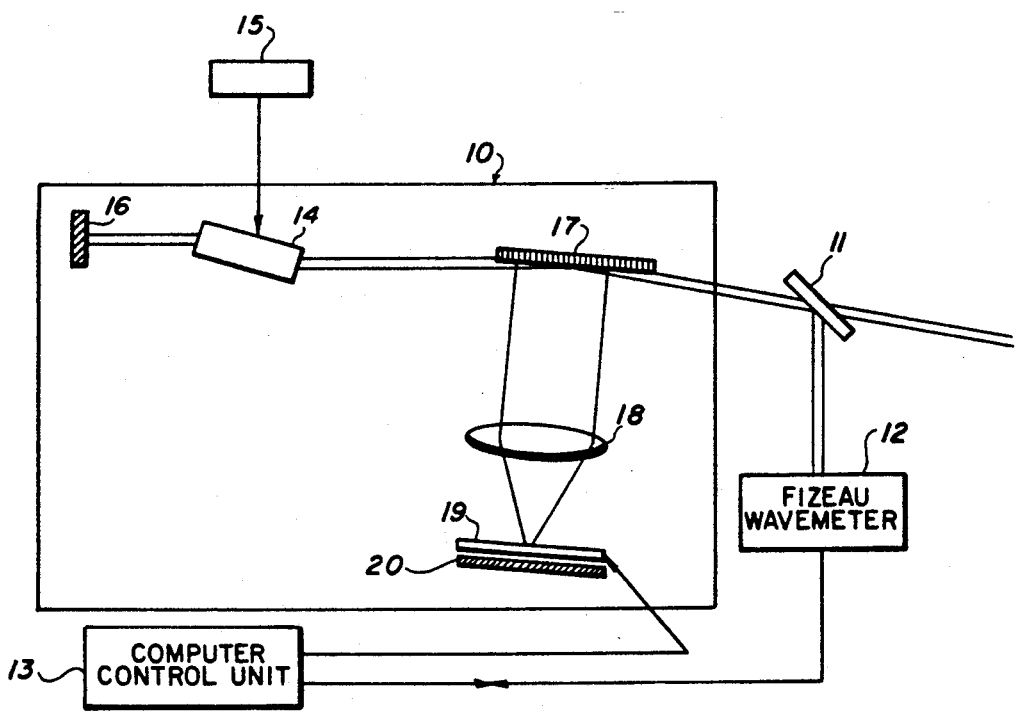

ELECTRONIC TUNING OF A BROADBAND LASER

BACKGROUND OF THE INVENTION

1. Field of the Invention

The present invention relates to lasers which are tunable over a broadband of frequencies. Lasers having a broad gain linewidth may be forced to lase in a narrow line by the insertion of a frequency selective element in the laser cavity. If the bandpass of this element is adjustable, the laser output frequency may be tuned over the gain linewidth.

2. Description of Prior Art

Some commonly used earlier tuning means include mechanically rotable gratings, tiltable or piezo electrically driven etalons, or adjustable prisms. These methods tend to be slow and are subject to hysteresis and resettability problems. This disclosure describes a non-mechanical tuning technique that can eliminate these problems and is potentially capable of very high frequency operation. The present invention contemplates the use of electronic tuning.

Prior work has been done on electrically tunable filters by such as Messieurs Taylor, Harris and Nich and Hansch, whose findings were reported in Applied Phycis Letters, Volume 19, No. 8, of 15 Oct. 1971, under the title "electronic Tuning of a Dye Laser Using the Acousto-Optic Filter." The work described therein contributes to the foundation of knowledge upon which the present invention rests. Tuning was achieved therein by applying an RF signal to an acousto-optic filter utilizing a collinear interaction between an ordinary optical wave, an extra-ordinary optical wave, and a travelling acoustical wave in a birefringent crystal. Although the optical frequency to which the laser is tuned is not equal to the acoustic frequency applied to the crystal, they must satisfy a particular relationship with one another. Only the corresponding optical frequency undergoes a 90° polarizing rotation to be provided as the output. All other optical frequencies are effectively blocked. That is, the RF frequency applied causes the corresponding optical frequency to undergo a 90° polarization rotation, which polarized frequency is the one transmitted by the filter and provided as the tuned output of the laser. All other frequencies are not related and are therefore, blocked by the filter.

OBJECTS AND SUMMARY OF THE INVENTION

It is an object of the invention to electronically tune a dye laser over a broadband frequency range. It is a further object of the invention to provide a laser tuning means which is both fast and capable of operation at high frequencies.

It is an additional object of the invention to provide an electronic laser tuning system which is not subject to hysteresis problems encountered in previously described tuning methods. Any hysteresis in the inventive unit will affect only the output level and not the wavelength.

DESCRIPTION OF DRAWING

The sole FIGURE shows the preferred embodiment of the invention in plan form.

DESCRIPTION OF PREFERRED EMBODIMENT

The new apparatus of the present invention consists of a laser unit 10, a beam splitter 11, a wavemeter 12 and a control unit 13. Inside the laser cavity are organic dye gain cell 14 which can be excited by a suitable source 15 such as a flash lamp or the output of another laser. Also inside the laser cavity are conventional end mirror 16, lens diffraction grating 17 shown here as a grazing incidence grating, telecentric lens 18, spatial light modulator (SLM) 19 and reflecting mirror 20. In operation, source 15 excites the dye gain cell which produces an output of a broad range of frequencies. The dye cell output impinges on diffraction grating 17 which is shown as a grazing incidence grating but may be made of other configurations. Telecentric lens 18 brings the diffraction pattern to a focus in the plane of the SLM 19. In this plane the various wavelengths are dispersed linearly in space and the cone of rays for each wavelength is normal to the focal plane. The SLM is backed by totally reflecting mirror 20.

The spatial light modulator is configured so that it can "turn on" the transmission at any point or points of any of a multiplicity of pixels along the direction of wavelength dispersion. When this is done, the grating SLM mirror combination acts as a high reflector for one or more selected wavelengths and a very lossy element for all other wavelengths. The laser will consequently lase at the chosen wavelength or combination of wavelengths. The laser output may be taken from the zeroth order of the grating or elsewhere as desired.

The laser output from the differaction grating 17 is also supplied to splitter 11. About 10% of the signal supplied to splitter 11 is routed to Fizeau wavemeter 12. The Fizeau wavemeter serves as a monitor. The computer control sends a signal to the spatial light modulator, telling it to turn on the pixel for the desired wavelength. The wavemeter measures the actual wavelength produced. If it is correct, it does nothing. If it is not correct a correction signal is derived by the control unit to adjust the pixel selected. Other types of wavemeter could be used, depending on whether the laser is running continuously or pulsed. The advantage of the Fizeau wavemeter is that it can a very accurate wavelength measurement on a single pulse.

The computer control unit 13 can be used to program the output of the laser as desired.

Although the preferred embodiment describes an organic dye laser, it is to be understood that any broadband laser could be used. For example, Alexandrite, rare earth, and semiconductor lasers could also be electronically tuned as disclosed by the invention.

We claim:

1. A laser electronic tuning system in which: a computer control unit sends a first input signal to a spatial light modulator which tunes on a pixel for a desired wavelength, a laser provides an input signal to a diffraction grating the output of which acts as a second input signal to said spatial light modulator, the output of said spatial light modulator acts as an input to a beam splitter which provides a precise laser output signal and a feedback signal to a wavemeter which measures the wavelength produced and supplies a correction signal to said computer control unit so as to adjust the pixel selected.

2. The system of claim 1 in which the wavemeter is a Fizeau wavemeter.

3. The system of claim 2 in which the diffraction grating is a grazing incidence grating.

4. The system of claim 3 in which the feedback signal is about 10% of the output signal of the Beam splitter.

5. The system of claim 4 in which the laser material is an organic dye.

6. The system of claim 5 which includes a telecentric lens between said diffraction grating and said spatial light monitor for focusing the diffraction pattern in the plane of the spatial light modulator.

7. A laser electronic tuning system comprising:
   A. a laser which includes
      1. an organic dye cell capable of providing a broadband frequency output,
      2. a diffraction grating, and
      3. a spatial light modulator backed by a totally reflecting mirror;
   B. a beam splitter;
   C. an interferometer; and
   D. a control unit:
   whereby an output signal from said laser is supplied to said beam splitter which provides a feedback signal via said interferometer and said control unit to said spatial light modulator to electronically tune the laser.

8. The system of claim 7 in which said diffraction grating is a grazing incidence grating which has a large grating.

9. The system of claim 8 in which said splitter is used to provide about 10% of said laser output signal as the feedback signal and about 90% as the laser output signal.

10. The system of claim 9 in which said interferometer is a Fizeau wavemeter.

* * * * *